United States Patent
Laiou et al.

(10) Patent No.: US 7,970,525 B2
(45) Date of Patent: Jun. 28, 2011

(54) METHOD FOR DETERMINING THE SPEED OF A MOTOR VEHICLE

(75) Inventors: Maria-Christina Laiou, München (DE); Alexander Meske, München (DE); Walter Kagerer, München (DE); Falk Langer, Marienberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/470,167

(22) Filed: May 21, 2009

(65) Prior Publication Data

US 2009/0265073 A1   Oct. 22, 2009

(51) Int. Cl.
*B60T 8/32* (2006.01)
*G01P 3/44* (2006.01)
*G01P 3/56* (2006.01)
*G06G 7/00* (2006.01)

(52) U.S. Cl. ............... 701/93; 701/70; 701/1; 702/145; 702/148

(58) Field of Classification Search .............. 701/70, 701/93, 74, 96, 98, 36, 40, 1; 180/170, 245, 180/282; 73/115.08; 702/145, 148, 146, 702/33, 142

See application file for complete search history.

(56) References Cited

U.S. PATENT DOCUMENTS

| | | | | |
|---|---|---|---|---|
| 5,313,391 A | * | 5/1994 | Sigl et al. | 701/90 |
| 6,438,506 B1 | * | 8/2002 | Yohpe et al. | 702/145 |
| 6,585,070 B1 | | 7/2003 | Hessmert et al. | |
| 6,611,781 B1 | * | 8/2003 | Gutmann | 702/148 |
| 6,826,469 B2 | * | 11/2004 | Iwata et al. | 701/93 |
| 7,319,927 B1 | * | 1/2008 | Sun et al. | 701/93 |
| 2003/0167116 A1 | * | 9/2003 | Erban | 701/74 |
| 2005/0143877 A1 | * | 6/2005 | Cikanek et al. | 701/22 |
| 2007/0083314 A1 | * | 4/2007 | Corigliano et al. | 701/80 |

FOREIGN PATENT DOCUMENTS

| | | |
|---|---|---|
| DE | 19534566 A1 | 3/1997 |
| GB | 2297619 A | 8/1996 |
| WO | 9304888 | 3/1993 |

\* cited by examiner

*Primary Examiner* — Thomas G Black
*Assistant Examiner* — Christine Behncke
(74) *Attorney, Agent, or Firm* — Barley Snyder LLC

(57) ABSTRACT

The invention relates to a method for determining the vehicle speed of a motor vehicle, wherein a provisional first speed value is determined for high speeds and a provisional second speed value is determined for low speeds and the vehicle speed is determined as a function of the determined provisional first speed value either from the provisional first speed value or from the provisional second speed value, or from a combination of the first and second speed values.

22 Claims, 2 Drawing Sheets

METHOD FOR DETERMINING THE SPEED OF A MOTOR VEHICLE

CROSS-REFERENCE TO RELATED APPLICATIONS

This application claims the benefit of the filing date under 35 U.S.C. §119(a)-(d) of International Patent Application No.: PCT/EP2007/009874 filed Nov. 15, 2007, which claims the priority of German Patent Application No. DE 10 2006 056 628.9 filed on Nov. 30, 2006.

FIELD OF THE INVENTION

The invention relates to a method for determining the speed of a motor vehicle and for detecting the standstill position of a motor vehicle.

BACKGROUND

Motor vehicles having various control systems require a determination of vehicle speed, that is then provided to these systems. One system, which requires the vehicle speed as an input signal is, for example, is a longitudinal control system that controls the speed of the vehicle by setting an acceleration value to preset desired or theoretical speed. Additionally, longitudinal control systems enhanced by distance control, which are known as distance-related longitudinal control systems, are also obtainable today from some manufacturers. Such systems, offered, for example by BMW, the Assignee of the present invention under the name of "Active Cruise Control", make it possible to automatically drive the motor vehicle while maintaining a desired distance from the vehicle ahead, at a desired speed or at an appropriately slower speed. In principle, the generally known longitudinal control or vehicle speed control systems, which maintain a specific predetermined speed, is enhanced by an additional distance function, such that the use of an "active" driving speed control of this type is also possible in heavy motorway and non-motorway road traffic. The system is therefore able to adjust the vehicle's speed to suit the surrounding traffic conditions.

The currently available longitudinal control systems or distance-related longitudinal control systems only control the speed down to a lower limiting speed of, for example 30 km/h. At such speeds, it is sufficient to determine the vehicle speed from the average wheel speed of the non-powered wheels. For average wheel speeds of the non-powered wheels that exceed a predetermined positive average threshold of, for example 0.4 km/h, the determined vehicle speed fairly accurately corresponds to the average wheel speed of the non-powered wheels. The resolution of this calculation is usually within the range of 0.1 km/h. Speeds for which the average of the wheel speeds is less than the predetermined average threshold are always output as zero, and negative speed values are not output. For longitudinal control systems, which are only operational down to a minimum speed of approximately 30 km/h, this is quite adequate, since on the one hand very low speeds are not required and on the other hand the resolution is also sufficiently low.

More recently, however, distance-related longitudinal control systems have been developed and used in vehicles and have been enhanced by a stop-and-go function, thus allowing a distance-related longitudinal control until the vehicle comes to a standstill and starts up again. In these longitudinal control systems, a reliable detection of a standstill state of the motor vehicle is necessary. If detecting the standstill state was only determined using the vehicle speed method mentioned above, where the average of wheel speed of the non-powered wheels is just under the average threshold, a standstill would be detected although the vehicle is still moving, ever so slightly. Additionally, is the vehicle is rolling back; a standstill state would also be detected. This imprecise and possibly premature standstill detection would result in the motor vehicle being stopped with a clearly noticeable jolt.

DE 195 03 270 A1 discloses a method for determining the standstill time of a vehicle, in which during a braking phase for at least one wheel, a threshold speed value is established, then at several successive times, in order to achieve a measurable minimum speed, at least one further speed value is detected for the wheel or wheels and the time of the vehicle standstill is estimated by forming one or more speed gradients between the detected speed values and by extrapolating them to zero speed. A method of this type is laborious and is based merely on an estimate.

Furthermore, so-called hill holder functions are well known, which are intended to hold the motor vehicle in a position stationary when on a hill. In order to detect a standstill position on the hill, the rotational direction of at least the non-powered wheels is evaluated, in addition to the speed of the vehicle. Thus, WO 93/04888 A1 discloses a standstill control device in which to detect a standstill position of a motor vehicle, the signals of a rotational direction sensor and the rotational speed of at least one wheel are observed and evaluated. An evaluation of this type is only expedient in the case of very slow vehicle speeds.

SUMMARY

An object of the invention, among other objects, is to provide an improved method for determining the vehicle speed of a motor vehicle, particularly with respect to the detection of a clear standstill position of the motor vehicle. The method for determining a vehicle speed (v_Fzg) of a motor vehicle through a control device, comprises the steps of determining a provisional first speed value (v1) for high speeds and a provisional second speed value (v2) for low speeds; and then determining the vehicle speed (v_Fzg) as a function of the determined provisional first speed value (v1) either from the provisional first speed value (v1) or from the provisional second speed value (v2) or from a combination of the first and second speed values (v1, v2).

BRIEF DESCRIPTION OF THE DRAWINGS

The invention will now be described in detail with reference to the accompanying figures wherein.

DETAILED DESCRIPTION OF THE EMBODIMENT(S)

Figure 1:
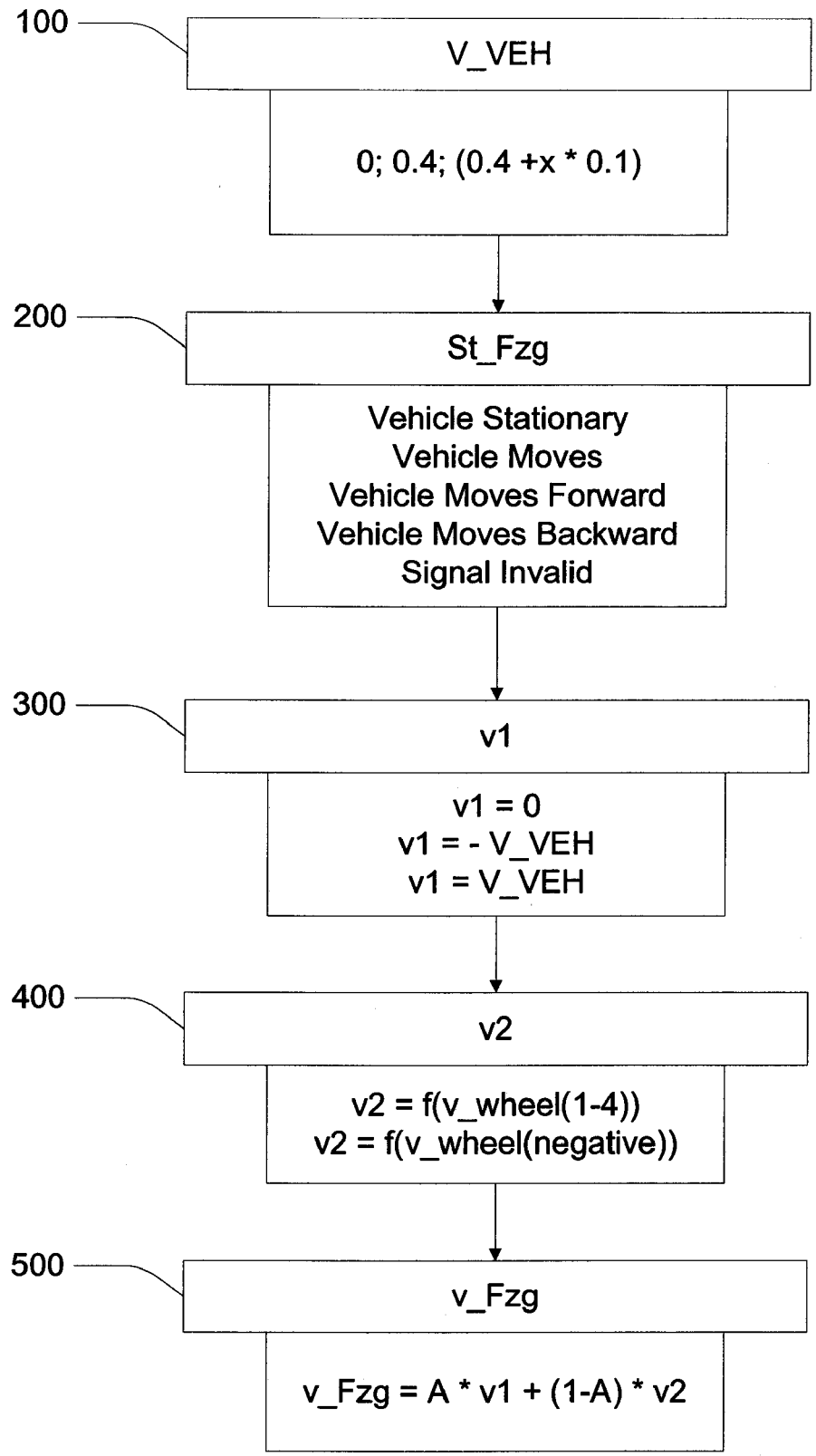
FIG. 1 shows a simplified flow chart for determining the vehicle speed in a control device according to the invention.

FIG. 1 shows a simplified flow chart for determining the vehicle speed in a control device, which is not shown here. At the start, in step 100, a non-negative speed value V_VEH is determined in a known manner, which is based on the wheel speed sensors of the corresponding wheels. The speed value V_VEH approximately corresponds to the average wheel speed of the non-powered wheels, independent of the rotation direction. This speed value V_VEH can assume any value up to a resolution of 0.1 km/h, as long as the determined average wheel speed is above a predetermined positive average threshold, for example 0.4 km/h. If the average is less than the predetermined average threshold, the non-negative speed value V_VEH always becomes zero, independent of the actual average. Thus in this embodiment, the non-negative speed value has, as the value 0 km/h, 0.4 km/h or a value which is greater than 0.4 km/h by a multiple of 0.1. As long as the vehicle is moving, the determined non-negative speed value suffices for most vehicle systems. If, however, a standstill state of the vehicle is to be detected, on the one hand a more accurate resolution is necessary, and on the other hand negative speeds must also be detected, as otherwise rolling back or reversing of the vehicle would not be detected.

In the next step 200, a status signal St_Fzg of the vehicle is determined. The signal indicates whether the vehicle is moving or is standing still. In addition, under certain conditions, the movement or driving direction of the motor vehicle can be determined. Thus, this signal can assume at least four different values: (1) Fzg_stationary, (2) Fzg_moves, (3) Fzg_moves forwards, (4) Fzg_moves backwards and an invalid signal. The signals indicate whether a vehicle standstill positioned has been reached, whether the vehicle is moving, whether it is moving forwards or backwards, or whether a signal error is present.

Vehicle standstill, i.e. Fzg_stationary is detected for example when at least three wheel speeds are less than a predetermined value, for example 0.2 m/s. A movement direction or driving direction is determined by evaluating the determined direction of rotation of the non-powered wheels. If the directions of rotation are identical and if a vehicle standstill (Fzg_stationary) is not detected, either Fzg_moves forwards or Fzg_moves backwards is output as the value of the signal St_Fzg as a function of the direction of rotation of the non-powered wheels. If a clear direction of movement cannot be assigned and if a vehicle standstill cannot be detected, only Fzg_moves is output as the value of the signal St_Fzg. If an error occurs, an invalid signal is output as the value of the signal St_Fzg.

In principle, the vehicle speed for the positive range from 0.4 km/h and also for the negative speed range from −0.4 km/h could then already be determined from the two signals V_VEH and St_Fzg. Likewise, detecting the vehicle in a standstill position would also be possible. However, if the signal St_Fzg is only occupied by the value Fzg_moves, then again no clear driving direction can be determined. Moreover, implausible states can occur if the signal V_VEH outputs the value zero (0) and the signal St_Fzg has a value other than Fzg_stationary.

To deal with this problem, in step 300, a provisional first speed value v1 is determined, which is particularly suitable for relatively high speeds or for speeds not in the region of 0 km/h. The determination of the provisional first speed value v1 should also consider possible implausible signal combinations of the signals V_VEH and St_Fzg, and should only determine a speed value for plausible signal combinations of V_VEH and St_Fzg.

The provisional first speed value v1 is now determined from the signals V_VEH and St_Fzg as follows. The provisional first speed value v1 assumes the value zero (0), if no clear driving direction of the vehicle is detected and/or if a standstill is clearly detected, i.e. the signal St_Fzg outputs the value Fzg_stationary. A clear driving direction of the vehicle is not detected, for example if the signal St_Fzg reproduces the value Fzg_moves, i.e. a clear driving direction has not been detected, or if the signal V_VEH outputs a value below a predetermined V_VEH threshold of, for example 2 km/h, and the signal St_Fzg outputs the value Fzg_moves backwards and in addition none of the wheel speed sensors outputs an actual wheel speed signal that indicates a negative wheel speed.

If the provisional first speed value v1 does not assume the value zero (0), it assumes the negative value of the non-negative speed value V_VEH, but only when it is clearly detected that the vehicle is moving backwards. This is recognized when the signal St_Fzg has the value Fzg_moves backwards, and when simultaneously at least one of the actual wheel speeds, determined by the wheel speed sensors, is negative, or when the signal St_Fzg has the value Fzg_moves backwards and at the same time the value of the signal V_VEH is not less than the predetermined V_VEH threshold.

If the provisional first speed value v1 does not assume either the value zero 0 or the negative value of the non-negative speed value V_VEH, the provisional first speed value is equated with the value of the non-negative speed value V_VEH.

In the next step 400, a provisional second speed value v2 is determined as a function of the actual wheel speeds v_wheel_i (where i=1, 2, 3, 4), determined by wheel speed sensors. If none of the actual wheel speeds v_wheel_i are negative, the provisional second speed value v2 is determined by forming the average of all wheel speeds v_wheel_i according to the following formula:

$$v2 = \frac{\sum_{i=1}^{4} v\_rad\_i}{4},$$

where $i = 1, 2, 3, 4.$

If at least one of the actual wheel speeds v_wheel_i or, in that case, v_wheel_j is negative then, the provisional second speed value v2 is determined by adding all the actually negative wheel speeds v_wheel_j and then dividing by 4, according to the following formula:

$$v2 = \frac{\sum_{j} v\_rad\_j}{4},$$

where $1 \le j \le 4.$

In the next step 500, the vehicle speed v_FZG is determined from the provisional first and second speed values v1 and v2 according to the following formula:

$$v\_Fzg = A * v1 + (1-A) * v2$$

The vehicle speed v_Fzg is determined as a function of the determined provisional first speed value v1 either from the provisional first speed value v1 or from the provisional second speed value v2 or from a combination of the first and second speed values v1 and v2. The weighting factor A serves to weigh the two provisionally determined speed values v1 and v2 such that the total of the weighting is 1. The definition of the weighting factor A ensures that the vehicle speed v_Fzg is further calculated if the determined provisional first speed value v1 is zero.

Figure 2:
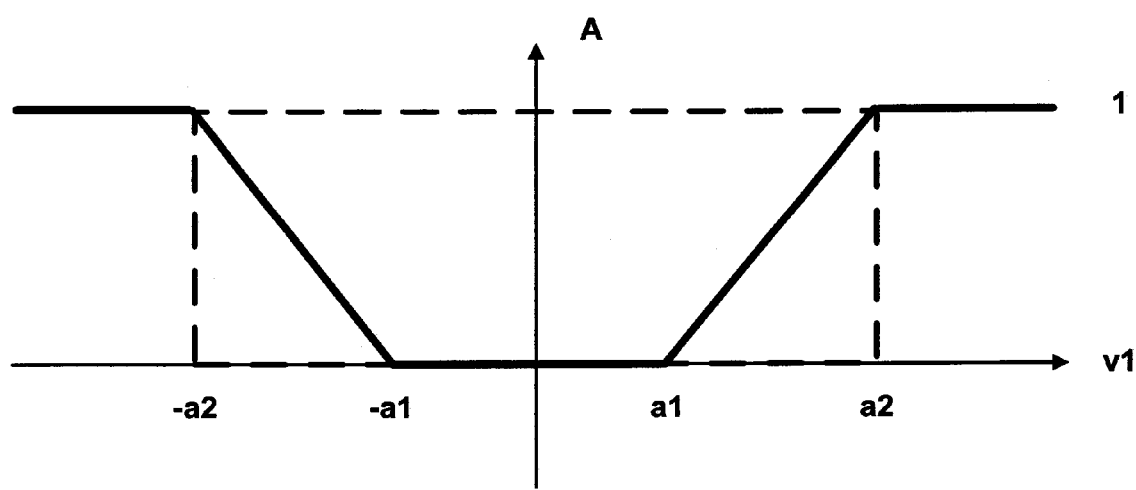
FIG. 2 shows the embodiment of the weighting or of the respective weighting factors for determining the vehicle speed.

The value of the weighting factor A is determined or set as a function of the provisional first speed value v1 according to FIG. 2. FIG. 2 shows a diagram in which the value of the weighting factor A is plotted over the provisional first speed value v1, the value of the weighting factor A being symmetrical to the y axis, i.e. the value of the weighting factor A is the same for the provisional first speed value v1 with the same value and is thus independent of the sign.

If the determined provisional first speed value v1 falls below, in terms of amount, a predetermined first threshold a1, thus if the provisional speed value is between −a1 and a1, the value of the weighting factor A is zero 0. The first threshold a1, which, due to the symmetry, is also set for the negative range as −a1, should have a very low value of, for example less than 0.5 km/h. According to the above formula, for determining the vehicle speed v_Fzg, the speed is thus only determined from the provisional second speed value v2, such that the vehicle speed v_Fzg corresponds to the provisional second speed value v2.

Since the sensors, used for determining the actual wheel speeds, have a very high resolution, the determined vehicle speed v_Fzg, in this range, is also very precise. This not only allows a precise detection of the motor vehicle in a standstill position, but also an immediate detection of a rolling back motion of the vehicle, as a result of which a corresponding vehicle reaction can be initiated.

If the determined provisional first speed value v1 exceeds, in terms of amount, a predetermined second threshold a2, i.e. if it is less than −a2 and greater than a2, the value of the weighting factor A becomes one 1. The second threshold a2, which likewise due to the symmetry, is also set for the negative range as −a2, and should have a slightly higher value compared to the first threshold, for example 1 km/h. According to the above formula, for determining the vehicle speed v_Fzg, the speed is thus only determined from the provisional first speed value v1, such that the vehicle speed v_Fzg corresponds to the provisional first speed value v1.

If the determined provisional first speed value v1 is, in terms of amount, between the first and the second threshold values a1 and a2, the value of the weighting factor A is between zero 0 and one 1. As shown by FIG. 2, the value of the weighting factor A decreases between the negative second threshold −a2, and the negative first threshold −a1 as a ramp function from one 1 to zero 0. Between the positive first threshold a1 and the positive second threshold a2, the value of the weighting factor A increases as a ramp function from zero 0 to one 1. The value of the weighting factor A can be expressed for these ranges by the following formula:

$$A = \frac{|v1| - a1}{a2 - a1}$$

If the vehicle speed v_Fzg is now calculated, according to the above formula for determining the vehicle speed, it can be seen that the vehicle speed v_Fzg, in these ranges, is determined from a combination of the first and second speed values v1 and v2. Therefore, the vehicle speed v_Fzg is a weighted total of the provisional first and second speed values v1 and v2, the weighting with the weighting factor A being dependent on the provisional first speed value and the weighting factors (A and (1−A)), amounting in total to one.

Determining vehicle speed can either be performed entirely in a control device, or the control device can receive signals, which are already available in the vehicle, for example the non-negative speed value V_VEH and the status signal St_Fzg as input signals, via the bus system of the vehicle and can be used to determine the vehicle speed according to the method of the invention.

The determined vehicle speed can be used for different systems in a vehicle, for example, those systems that require a precise detection of the motor vehicle in a standstill position. If the vehicle is fitted, for example with a distance-related longitudinal control system (which can be controlled through the standstill state of the vehicle), a convenient stopping or braking through the standstill state is possible.

Therefore, according to the invention, a provisional first speed value v1 for high speeds and a provisional second speed value v2 for low speeds is determined. The vehicle speed v_Fzg is then determined as a function of the provisional first speed value v1, which has been established either from the provisional first speed value v1 or from the provisional second speed value v2 or from a combination of the first and second speed values v1, v2. It is essential in this case that the provisional first speed value v1 is determined by a method which is suitable for relatively high speeds, and the provisional second speed value v2 is determined by a method which is suitable for particularly slow speeds or for a standstill detection.

If a very low provisional first speed value v1 is determined, which is less than a first threshold, for example less than 0.5 km/h, only the determined provisional second speed value v2 is used to determine the vehicle speed. If, on the other hand, a greater provisional first speed value v1 is determined, which is greater than a second threshold a2, the second threshold a2 being the same as or greater than the first threshold a1, then only the determined provisional first speed value v1 is used to determine the vehicle speed. If the determined provisional first speed value v1 is between the first and the second thresholds a1, a2, the vehicle speed v_Fzg is determined from both provisional speed values a1, a2. Within this range, between the first and second thresholds a1, a2, the determination is performed by adding the two provisionally determined speed values v1, v2 with a corresponding weighting A, such that the weighting factors (A and (1−A)) are "one" in total. Weighting takes place such that the determination of the vehicle speed v_Fzg during the transition from the determination merely from the provisional first speed value v1 to the determination merely from the provisional second speed value v2 and vice versa continuously increases or decreases the respective proportion of the first and second speed values v1, v2, such that the total of the weighting factors (A and (1−A)) is one, and the weighting factor increases or decreases between zero and one as a ramp. There is thus no jump during the determination of the vehicle speed v_Fzg in the transition from the determination according to the first method and the second method if the two methods had determined different speed values.

The provisional first speed value v1 can assume three different values. It assumes the value zero when no clear driving direction of the vehicle is detected and/or when a precise standstill is detected. No clear driving direction is detected, for example when it can be detected that the vehicle is travelling, but the direction cannot be clearly identified, or based on different signals, when different vehicle directions are detected. A standstill state is detected when at least a plurality of wheel speeds, established by wheel speed sensors, are very low or approach zero.

The provisional first speed value v1 assumes the negative value of a speed value, which is becoming non-negative if it does not assume the value zero and if it can be clearly detected that the vehicle is travelling backwards. This is detected, for example when the non-negative speed value V_VEH, determined by the average of the rotational speed of the non-powered wheels independent of the direction of rotation, is above a specific threshold and the direction of rotation of the non-powered wheels is negative, or if the direction of rotation of the non-powered wheels is negative and at least one actual wheel speed, determined by the wheel speed sensors, is negative.

If neither the conditions for assuming the value zero nor the conditions for assuming the negative value of the non-negative speed value V_VEH are satisfied, the provisional first speed value v1 assumes the (positive) value of the non-negative speed value V_VEH.

To simplify the determination of the provisional first speed value v1, it is also possible to provide basically two values or signals, firstly, the speed value V_VEH, which is becoming non-negative. As already mentioned, this is determined by forming the average wheel speed of the non-powered wheels, wherein the direction of rotation remains unconsidered. Thus, a value is always produced which is greater than or equal to zero. Moreover, a status signal can be provided which also considers the direction of rotation of the wheels. The signal can detect a direction of rotation when the direction of rotation of the non-powered wheels corresponds. Furthermore, a standstill position can be detected when a plurality of wheel speeds is virtually zero. If a clear direction cannot be established and a standstill position cannot be detected either, a signal is output which merely indicates that the vehicle is moving.

In contrast to determining the provisional first speed value v1, which is particularly suitable for higher speeds, the provisional second speed value v2 is detected such that it either corresponds to the average of all actual wheel speeds, if none of the determined actual wheel speeds is negative, and that it is determined as a function of the total of the negative wheel speeds, if at least one of the actual wheel speeds is negative.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed:

1. A method for determining a vehicle speed of a motor vehicle through a control device, comprising the steps of:
    determining a provisional first speed value for high speeds and a provisional second speed value for low speeds, the provisional first speed value being determined such that that it assumes the value zero if no clear driving direction of the vehicle is detected and/or if a standstill state is detected; and
    determining the vehicle speed as a function of the determined provisional first speed value either from the provisional first speed value or from the provisional second speed value or from a combination of the first and second speed values,
    wherein the provisional second speed value is determined such that it either corresponds to the average of all the actual wheel speeds if none of the determined actual wheel speeds is negative and otherwise is determined as a function of the total of the negative wheel speeds.

2. The method according to claim 1, wherein the vehicle speed is determined from the provisional second speed value, such that the vehicle speed corresponds to the provisional second speed value when the determined provisional first speed value falls below a predetermined first threshold.

3. The method according to claim 1, wherein the vehicle speed is determined from the provisional first speed value, such that the vehicle speed corresponds to the provisional first speed value when the determined provisional first speed value exceeds a predetermined second threshold.

4. The method according to claim 2, wherein the vehicle speed is determined from the provisional first speed value such that the vehicle speed corresponds to the provisional first speed value when the determined provisional first speed value exceeds a predetermined second threshold.

5. The method according to claim 1, wherein the vehicle speed is determined from a combination of the first and second speed values such that the vehicle speed is a weighted total of the provisional first and second speed values, the weighting of the total being dependent on the provisional first speed value and the weighting factors amounting to one in total, when the determined provisional first speed value exceeds a predetermined first threshold and falls below a predetermined second threshold.

6. The method according to claim 1, wherein the provisional first speed value is determined such that it assumes the negative value of a speed value which is becoming non-negative if it does not assume the value zero and if it is clearly detected that the vehicle is moving backwards.

7. The method according to claim 6, wherein the provisional first speed value is determined such that it assumes the value of the non-negative speed value if it does not assume the value zero or the negative value of the non-negative speed value.

8. The method according to claim 7, wherein the non-negative speed value is determined such that it corresponds to the average wheel speed of the non-powered wheels independently of the direction of rotation of the wheels, if the average exceeds a predetermined positive average threshold and otherwise is zero.

9. The method according to claim 6, wherein the non-negative speed value is determined such that it corresponds to the average wheel speed of the non-powered wheels independently of the direction of rotation of the wheels, if the average exceeds a predetermined positive average threshold and otherwise is zero.

10. The method according to claim 1, wherein the provisional first speed value is determined such that it assumes the value of the non-negative speed value if it does not assume the value zero or the negative value of the non-negative speed value.

11. The method according to claim 10, wherein the non-negative speed value is determined such that it corresponds to the average wheel speed of the non-powered wheels independently of the direction of rotation of the wheels, if the average exceeds a predetermined positive average threshold and otherwise is zero.

12. A method for determining a vehicle speed of a motor vehicle through a control device, comprising the steps of:
    determining a provisional first speed value for high speeds and a provisional second speed value for low speeds; and
    determining the vehicle speed as a function of the determined provisional first speed value either from the provisional first speed value or from the provisional second speed value or from a combination of the first and second speed values;
    wherein the provisional second speed value is determined such that it either corresponds to the average of all the actual wheel speeds if none of the determined actual wheel speeds is negative and otherwise is determined as a function of the total of the negative wheel speeds.

13. The method according to claim 12, wherein the vehicle speed is determined from the provisional second speed value, such that the vehicle speed corresponds to the provisional second speed value when the determined provisional first speed value falls below a predetermined first threshold.

14. The method according to claim 12, wherein the vehicle speed is determined from the provisional first speed value, such that the vehicle speed corresponds to the provisional first speed value when the determined provisional first speed value exceeds a predetermined second threshold.

15. The method according to claim 12, wherein the vehicle speed is determined from a combination of the first and second speed values such that the vehicle speed is a weighted total of the provisional first and second speed values, the weighting of the total being dependent on the provisional first speed value and the weighting factors amounting to one in total, when the determined provisional first speed value exceeds a predetermined first threshold and falls below a predetermined second threshold.

16. The method according to claim 12, wherein the provisional first speed value is determined such that it assumes the negative value of a speed value which is becoming non-negative if it does not assume the value zero and if it is clearly detected that the vehicle is moving backwards.

17. The method according to claim 16, wherein the provisional first speed value is determined such that it assumes the value of the non-negative speed value if it does not assume the value zero or the negative value of the non-negative speed value.

18. The method according to claim 17, wherein the non-negative speed value is determined such that it corresponds to the average wheel speed of the non-powered wheels independently of the direction of rotation of the wheels, if the average exceeds a predetermined positive average threshold and otherwise is zero.

19. The method according to claim 18, wherein the provisional second speed value is determined such that it either corresponds to the average of all the actual wheel speeds if none of the determined actual wheel speeds is negative and otherwise is determined as a function of the total of the negative wheel speeds.

20. The method according to claim 16, wherein the non-negative speed value is determined such that it corresponds to the average wheel speed of the non-powered wheels independently of the direction of rotation of the wheels, if the average exceeds a predetermined positive average threshold and otherwise is zero.

21. The method according to claim 12, wherein the provisional first speed value is determined such that it assumes the value of the non-negative speed value if it does not assume the value zero or the negative value of the non-negative speed value.

22. The method according to claim 21, wherein the non-negative speed value is determined such that it corresponds to the average wheel speed of the non-powered wheels independently of the direction of rotation of the wheels, if the average exceeds a predetermined positive average threshold and otherwise is zero.

* * * * *